S. A. MORRIS.
MONOCYCLE.
APPLICATION FILED JAN. 28, 1908.
914,597.
Patented Mar. 9, 1909.
2 SHEETS—SHEET 1.
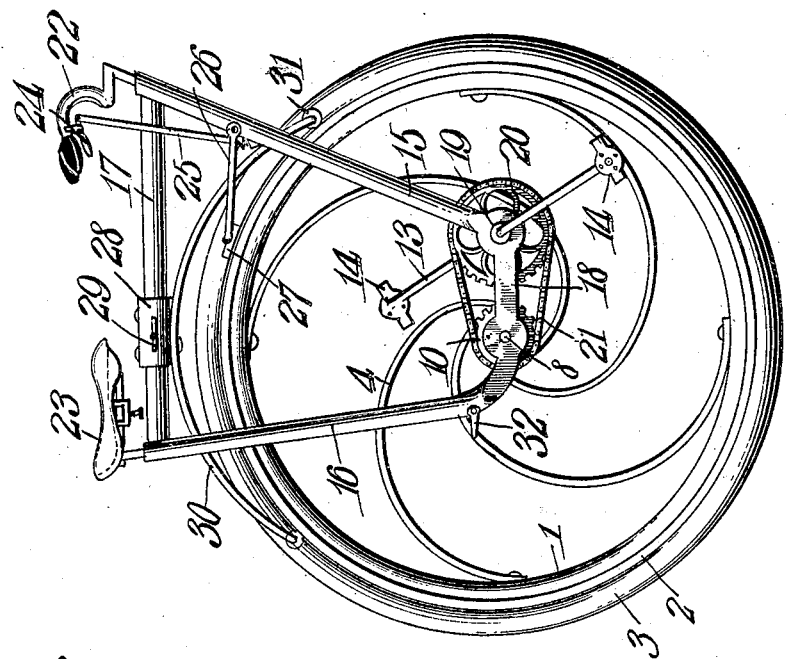
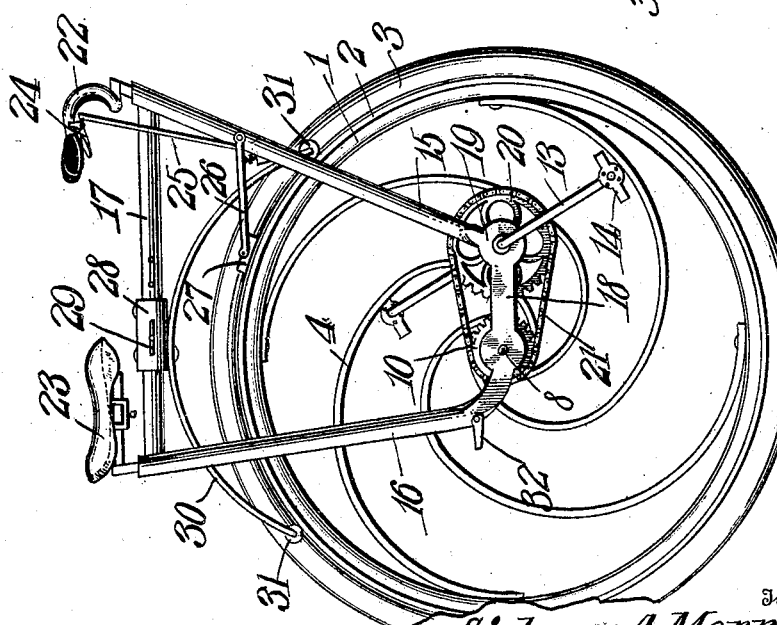
Inventor
Sidney A. Morris.
Witnesses
By C. A. Snow & Co.
Attorneys S. A. MORRIS.
MONOCYCLE.
APPLICATION FILED JAN. 28, 1908.
914,597.
Patented Mar. 9, 1909.
2 SHEETS—SHEET 2.
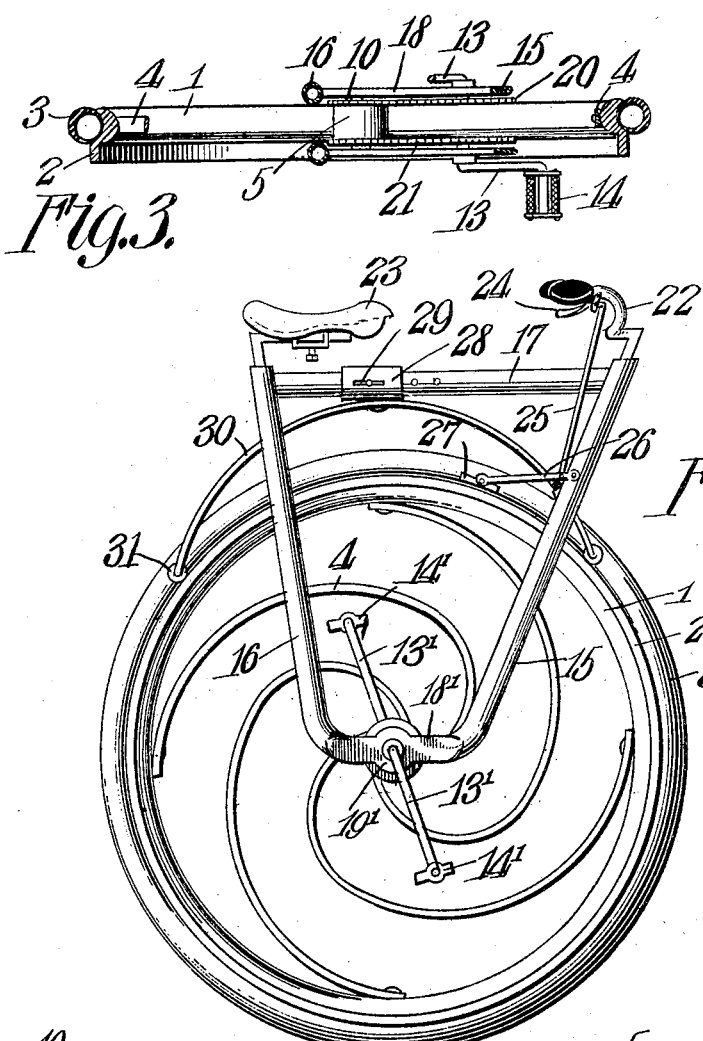
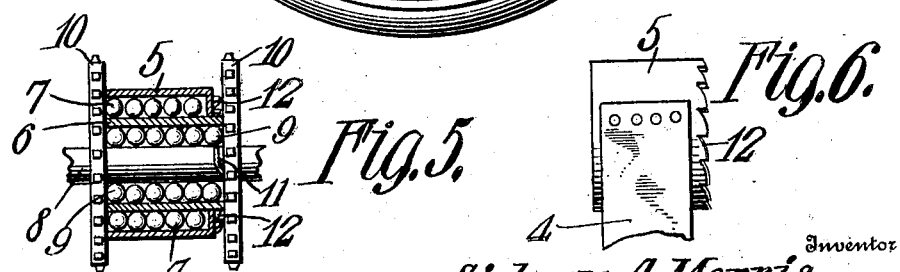
Inventor
Sidney A. Morris.

UNITED STATES PATENT OFFICE.

SIDNEY ALBERT MORRIS, OF BUFFALO, TEXAS.

MONOCYCLE.

No. 914,597.      Specification of Letters Patent.      Patented March 9, 1909.

Application filed January 28, 1908. Serial No. 413,049.

*To all whom it may concern:*

Be it known that I, SIDNEY ALBERT MORRIS, a citizen of the United States, residing at Buffalo, in the county of Leon and State of Texas, have invented a new and useful Monocycle, of which the following is a specification.

This invention has reference to improvements in monocycles, and its object is to provide a means whereby the rider may more certainly maintain a balance upon the wheel when riding.

The invention comprises essentially a wheel rim provided, as usual, with a suitable tire, and this rim has on one, or if desirable, on both sides a laterally-extending flange. The hub of the wheel is connected to the rim through the intermediary of elastic spokes, which when the weight of the rider is applied will give to a small extent so that while the rider is mounted on the wheel the hub is depressed below the plane of the horizontal diameter of the wheel. Supported by the hub is a suitable framework upon which is mounted the rider's seat and suitable handle bars, and this framework is provided with an elastic rest engaging the flange on the rim of the wheel and serving to aid in maintaining the rider in the upright position, since when the rider is mounted on the wheel the axis of the hub, and consequently of the frame, is eccentric to the wheel.

Suitable pedals and cranks may be applied directly to the hub in the usual manner, or gearing may be applied through the intermediary of the usual chain connections to increase the relative speed of rotation of the wheel and pedals, since with the higher gearing the latter is so located with reference to the wheel that the pedal cranks must be in two separate pieces and be separately connected to the hub, the connections being such that these cranks are kept in their proper relative positions through these connections and the hub.

The hub may be made in two parts one movable with relation to the other so that by means of a simple clutch connection the wheel may be driven in a forward direction and when so desired the pedals may be held stationary with relation to the wheel, while the wheel still is free to rotate. While of course the usual coaster-brake may be applied to this structure, it is preferable to employ a friction brake controlled by a suitable brake lever on the handle bar, and this friction brake may be brought into operative relation with the flange on the wheel rim when desired.

The invention will be best understood from a consideration of the following detail description taken in connection with the accompanying drawings forming a part of this specification, in which drawings,—

Figure 1 is a side elevation of the improved monocycle with the parts in the position assumed when the rider is dismounted. Fig. 2 is a similar view of the monocycle with the parts in the position assumed when subjected to the weight of the rider. Fig. 3 is a horizontal cross section with parts in elevation. Fig. 4 is a side elevation of a modified form of the monocycle, and Figs. 5 and 6 are detail views, of a portion of the structure shown in Figs. 1, 2 and 3.

Referring to the drawings, there is shown a wheel rim 1, which may be of the ordinary construction, and projecting from one side of this rim is an annular flange 2. Seated in the rim is a tire 3, which may be of any approved construction, and is only diagrammatically represented in Fig. 3 of the drawings since this tire may be either of the pneumatic type or the cushion type or the solid type, as desired. The wheel rim has secured to it a number of spiral springs 4 equally spaced and constituting the spokes of the wheel. These spokes are each attached at their other ends to the inner face of the rim at equidistant points, and their inner ends are likewise attached to the sleeve 5 constituting a part of the hub of the wheel. This sleeve is mounted upon another inner sleeve 6 and is separate therefrom by a series of anti-friction balls 7 or other anti-friction bearings, and the inner sleeve 6 is in turn mounted upon an axle 8 through the intermediary of a series of anti-friction balls 9 or other suitable anti-friction bearing. The sleeve 6 carries at each end a sprocket wheel 10, and one of these wheels is provided with a number of spring teeth 11 arranged to engage ratchet teeth 12 formed on one end face of the sleeve 5. The relation of the spring teeth 11 and ratchet teeth 12 is such that the teeth 11 will freely ride over the teeth 12 when the relative rotation of the parts is in one direction but will engage the teeth 12 when the relative rotation of the parts is in the other direction. The spring teeth 11 and the ratchet teeth 12 are to be taken as indicative of any suitable one-way clutch mechanism between the hub sleeve 6 and the hub sleeve 5.

In the structure of Figs. 1 and 2 there are provided cranks 13 and pedals 14 mounted as hereinafter described, while in the structure shown in Fig. 4 the cranks 13' provided with pedals 14' are mounted directly on the axle and in this case the axle may be connected with the wheel spokes through a suitable clutch mechanism such as described, so that when it is desirable to coast the pedals may be held stationary while the wheels continue to revolve in the usual manner.

Referring again to the structures of Figs. 1 and 2 it will be seen that there is carried by the axle 8 a suitable frame including a front fork 15 and a rear fork 16 straddling the wheel and connected near their upper ends by a reach 17, so that the frame of the machine is substantially triangular. The lower end of the frame of the machine is formed with a horizontal extension 18 connecting the support for the hub with another support 19, one on each side of the machine and at the lower ends of the legs of the fork 15, and each support 19 carries one or the other of the cranks 13. These cranks are, at their outer ends, suitably mounted in the supports 19 and carry inside of the support 19 a sprocket-wheel 20 one for each crank, and this sprocket wheel is connected by means of a suitable sprocket-chain 21 to the corresponding sprocket-wheel 10 on the hub. By this means any speed relation between the pedals and the main wheel of the machine may be provided. Because of the location of the cranks in the structure shown in Figs. 1 and 2, the two cranks cannot be directly connected, since such direct connection would interfere with the spokes. Therefore there are provided two gear wheels 20, one for each crank, and two chains 21, so that the pedal cranks are connected together through the intermediary of the hub and the sprocket-chain connections therewith. In Fig. 4 the lower ends of the forks 15 and 16 are connected by a horizontal extension 18' including a support 19' for the axle. The upper end of the front fork 15 carries handle bars 22 and the upper end of the rear fork 16 carries a saddle 23. The handle bars and saddle are adjustable in the usual manner in a direction longitudinal of the respective forks, and being of the usual construction need not be particularly described. Fast to one of the handle bars is a brake lever 24 connected by a link 25 to a brake bar 26 carrying a brake shoe 27 in operative relation to the flange 2. Mounted on the reach 17 is a sleeve 28 adjustable to various positions along the same, in which adjusted positions the sleeve may be fastened by means of a wing screw 29, or this wing screw may be replaced by an ordinary set screw. The sleeve 28 carries on its under side a bow spring 30, at each end of which is a roller 31 in operative relation to the flange 2 already mentioned.

When the monocycle is at rest with the rider dismounted, the axis of the hub is coincident with the axis of the wheel rim 1. Suppose, now, that the rider is mounted on the machine with the weight resting on the seat 23 and the feet on the pedals, then the spring spokes 4 give more or less under this weight, and the axis of the hub is brought closer to the ground, as indicated in Fig. 2 so that the axis of the hub is no longer coincident to the axis of the wheel but is eccentric thereto. Under these conditions the spring 30 is also brought under stress with the rollers 31 spread to a somewhat greater extent than shown in Fig. 1. Now, any rotative movement of the frame of the machine about the axis of the hub is resisted by the increased tendency of the spring 30 to assume its normal position, thus causing the rollers 31 to hug the rim 1 with increased force so that the rider is to a commensurate extent aided in maintaining an upright position upon a single supporting wheel. The wheel is managed by the rider in the same manner as a bicycle is managed, except that the steering is accomplished by the movement of the body of the rider laterally to one side or the other. Should the rider desire to coast, then the pedals are held against rotation by the feet of the rider and the ratchet-teeth 9 will under these conditions ride idly under the spring teeth 11 and the wheel will be carried forward by its own momentum or by gravity as the case may be. Should the rider desire to decrease the speed, the brake shoe 27 is applied to the rim 2 with such force as may be desired or necessary. In order that the rider may readily mount the wheel a suitable step 32 is provided upon one of the legs of the rear fork 16.

What is claimed is:—

1. A monocycle provided with elastic spokes, a hub connected to the inner ends of said spokes, a frame for carrying the rider mounted on said hub, and means connected to the frame and engaging the wheel and yieldable under the weight of the rider.

2. A monocycle comprising a wheel with a rim provided with a laterally-extending annular flange, a frame yieldably connected to the wheel rim, and yielding supports for the frame engaging the flange of the rim at separated points on either side of a vertical plane through the axis of the wheel.

3. A monocycle comprising a wheel having a rim provided with a laterally-extending annular flange, elastic spokes connected to the wheel rim at one end, a hub connected to the other end of the spokes, a frame carrying a saddle and handle bars and mounted on the hub, and an elastic support adjustably mounted on the frame and engaging the flange on the rim on opposite sides of the vertical plane through the axis of the hub.

4. A monocycle provided with elastic spokes, a hub connected to the inner ends of said spokes, a frame, for carrying the rider, mounted on said hub, means for engaging the wheel and yieldable under the weight of the rider, and means connected to the frame and adjustable in the direction of the length thereof for supporting the first-named means.

5. A monocycle comprising a wheel with a rim provided with a laterally-extending annular flange, a frame yieldably connected to the wheel rim, and yielding supports for the frame adjustable thereon in the direction of the length of the said frame and engaging the flange of the rim at separate points on either side of the vertical plane through the axis of the wheel.

6. A monocycle comprising a wheel, and a frame thereon consisting of a front fork, a rear fork, both rising from the axis of the wheel and diverging toward the free end, a reach connecting the free ends of the said forks, a handle bar carried by the upper end of the front fork, and adjustable in a direction longitudinal of said fork and a seat carried by the upper end of the rear fork and adjustable in a direction longitudinal of said fork.

7. A monocycle comprising a wheel having a rim provided with a laterally extending annular flange, elastic spokes connected to the rim at one end, a hub connected to the other end of the spokes, a frame comprising front and rear forks diverging from the hub, a reach connecting the divergent ends of the forks, handle bars carried by one of the forks, a saddle carried by the other fork, and an elastic support adjustably mounted on the frame and engaging the flange on the rim on opposite sides of the vertical plane through the axis of the hub.

In testimony that I claim the foregoing as my own, I have hereto affixed my signature in the presence of two witnesses.

SIDNEY ALBERT MORRIS.

Witnesses:
N. BLOOM,
ROBT. MORRIS.